Aug. 23, 1932.  B. E. CROCKER  1,872,900
PETROLEUM SMELTING PROCESS
Filed May 19, 1930  2 Sheets-Sheet 1

INVENTOR
BERTRAM E. CROCKER
BY
ATTORNEY

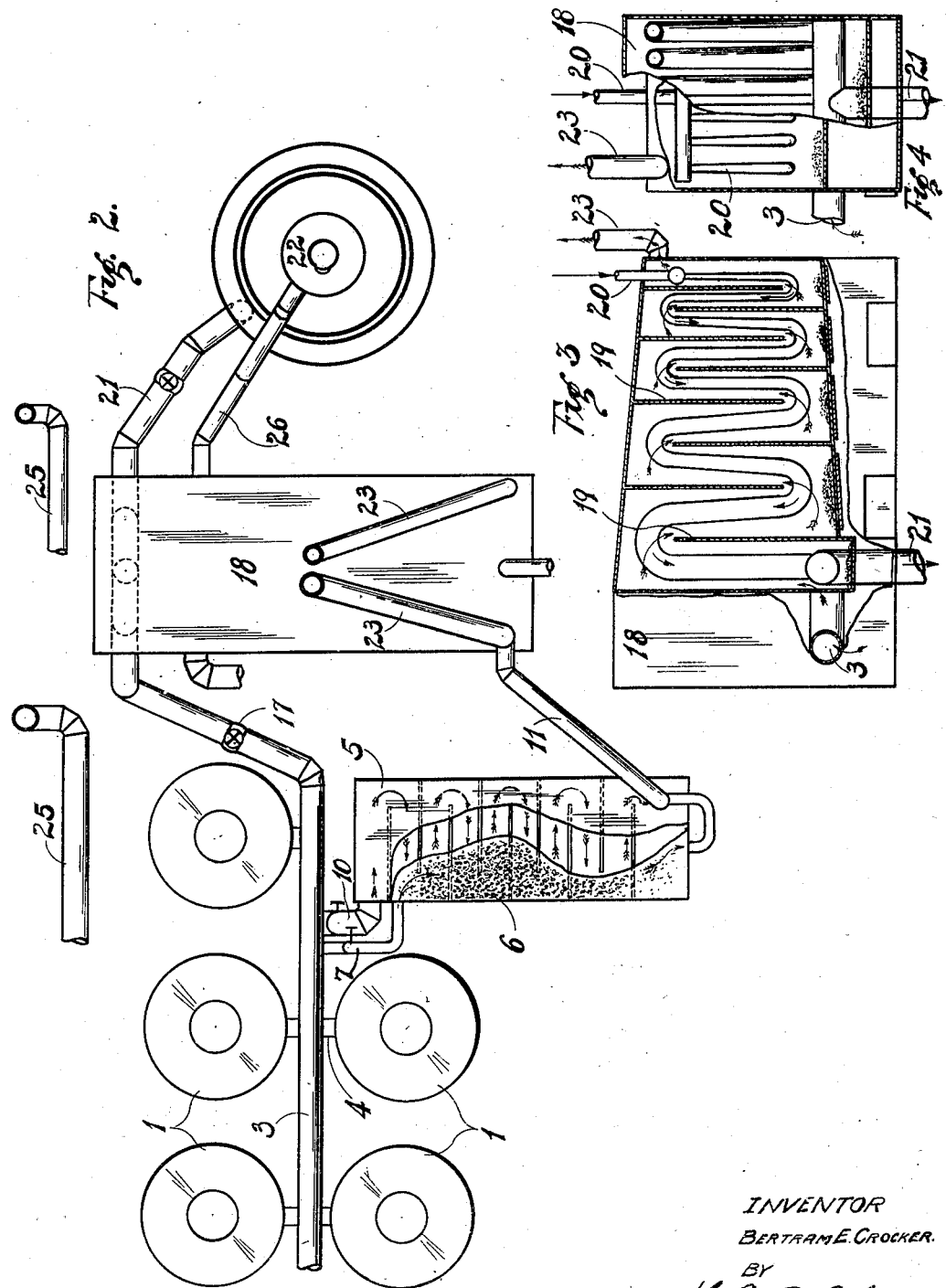

Patented Aug. 23, 1932

1,872,900

UNITED STATES PATENT OFFICE

BERTRAM E. CROCKER, OF LOS ANGELES, CALIFORNIA

PETROLEUM SMELTING PROCESS

Application filed May 19, 1930. Serial No. 453,558.

This invention relates to a process and means for producing smelted base metals from their ores by a petroleum electric system, that is, by using petroleum as a basis for reduction fuel and electric energy as a means of extraction of the carbon residium from the carbonized petroleum to form the reduction fuel. It is therefore an improvement of my Patent No. 1,676,729, being in itself an oil carbonizing and heat absorbing process. The steps comprise carbonization of oil, and absorption of the sensible heat thereof, both of the carbon produced and also of the gas produced by said oil carbonization, the transference of said sensible heat to an agent or conductor which conducts said heat to a locality where it is made effective in producing useful work.

The recovery of this sensible heat is a special feature of my process as it is now lost in the oil gas process noted in United States Patent, No. 883,466, Mar. 31, 1908, and in the method commonly used of collecting the carbon from the gas by the passing of the same through water. The water takes out the carbon and also the heat of the gas which it loses by dissipation to the atmosphere from the carbon settling pits. The recovery of this sensible heat is made possible by not collecting the carbon by the water method. In my process, the carbon is precipitated electrically from the gas that is generated in the carbonizing of the oil. It is mainly precipitated after, though some is precipitated during the extraction of the sensible heat of the gas by passing the same through a sensible heat air preheater, which is made a part of this process as a means of heat transfer. Out of this oil gas sensible heat air preheater is produced preheated air, a conductor which conducts the transferred heat to a point where it is made effective in producing useful work. Examples of this useful work, are preheated air for blast furnaces and for combustion of fuel under boilers.

I particularly point out a new and useful source of heat for blast air, with the following distinction: That whereas gas, especially blast furnace gas, is used for preheating blast air; that the gas is burned using up its potential heating value to heat checker work bricks in hot blast stoves; that air is subsequently turned into these stoves to absorb the heat from the bricks, and that no other method has been found with which to effectively heat blast air. Witness that in my system the air is not heated by burning gas and then destroying the potential heat of same, which when once ignited cannot be burned again; but by using the sensible heat (temperature) of manufacture of the gas and this gas, obtained from carbonizing petroleum, still preserving the potential heating value of the gas thus produced, for other useful purposes.

I further direct attention to the fact that the sensible heat of blast furnaces gas, from iron blast furnaces for example, as it emits from blast furnaces, is only about 450 degrees F. equal $101\tfrac{3}{10}$ B. t. u. per pound; that even if 90% of this were saved by immediately burning it, would add but 90 B. t. u. to the 1057 B. t. u. per pound of potential heat of the gas, giving about 1147 B. t. u. per pound of gas less the heat escaping from the stoves in products of combustion, leaving a net of about 860 B. t. u. per pound of gas that is useful in heating the checker brick of the stoves, the source of heat for the air. The sensible heat of manufacture of oil gas, however, being at a temperature of 1600 degrees F. which when cooled to 60 degrees F. the average normal air temperature yields about 1359 B. t. u. per pound of gas for sensible heat alone. Moreover, there is a sensible heat carried by the carbon particles resulting from the oil carbonization process of about 300 B. t. u. per pound of gas, making a total of about 1660 B. t. u. per pound.

The use of blast air, preheated by the above described method, is adaptable to the use in a blast furnace with petroleum coke made from the carbon residue obtained from petroleum or hydrocarbons in the manufacture of oil gas as described in my patent for making synthetic carbonaceous coke briquets, Patent Number 1,676,729. It is adaptable inasmuch as the extraction of the carbon residue by the electrical precipitation method herein mentioned, permits a retrieving of the sensible heat of the gas, and its transference to blast air. This invention, therefore, by reason of this method of extraction of the carbon residue and the saving of the heretofore wasted sensible heat, is an improvement on my United States Patent, Number 1,676,729.

Previous to the electrical precipitation or cleaning of the carbon from the gas, there is of necessity a pre-cleaning of the carbon particle from the gas in the heat exchanger. This is due to the deposits which occur in the chambers of same from which it can be withdrawn through doors provided, or by means of a mechanical conveying system. Before the gas is allowed to enter the exchanger, however, it may be necessary to effect an initial cleaning of the suspended carbon to encourage subsequent easy flow of the gas through the exchanger and electrical precipitation unit. This initial cleaning is effected by the passing of the gas through a mat or mass of ore. A mechanical cleaning of the gas is thus obtained by retarding and depositing the carbon. In the case of oxide ores, there may be a chemical reaction between the hot carbon and the oxygen of the ore which ore, by contact with the gas will also be hot by reason of the sensible heat of the gas as it passes contiguous to the ore.

An intermediate step in my process is indicated here in that some of the carbon carrying gas will cause a preliminary reduction of some of the ore before charging the same into the blast furnace. Moreover, the gas itself may cause a reduction by reason of its hydrocarbon gases; in which case the calorific power of the gas is such that but little of it will be required to reduce one ton of iron ore, for example, compared with the large amount of gas evolved for the production of the requisite amount of petroleum coke required in the blast furnace.

The water vapor formed can be easily taken care of in the condensing apparatus, and the inert $CO_2$ that is turned back into the main gas stream, together with that portion of the gas not affected by the ore, will be of such slight amount as not to appreciably dilute the gas.

The reactions that take place in this initial cleaning as a secondary step to the mechanical cleaning, are aided by the sensible heat of the gas as it passes through the ore in direct contact with same. This latter reaction and its heat, a natural consequence of the interposition of the ore mat in the gas stream for carbon deposition, it seems reasonable to aid by a reinforcement of additional heat, transmitted by conduction through the container of the ore in by-passing contiguous to it a further quantity of oil gas still containing its heat of manufacture or sensible heat. This latter quantity of gas will still have its potential energy or heating value for ignition at any later time, but will heat the material of the container by conduction as it passes along contiguous to it. Another application of the transference of the sensible heat of oil gas being the transference to solids and fluids to aid in their chemical reactions.

Initial cleaning of the gas by the interposition of the ore in the gas stream may be made more effective by decreasing the amount of free carbon per cubic foot by first mixing the oil gas with natural gas before contact with the ore. This decrease per unit volume is thus controllable mechanically, to get the best cleaning action. Moreover, it is apparent that the gases must be in motion relative to the ore or vice versa, always presenting new columes of gas to contact the ore. Hence the gas stream is passed but once in contact with a given piece of ore. A piece of ore combs a given unit volume of gas but once, either as the gas passes the ore, or the ore passes the gas.

Mixing natural gas with the newly made oil gas will lower the sensible heat of the oil gas. To keep the heat as intense as before mixing, it may be desirable to preheat the natural gas.

In the drawings

Figure 2 is a sectional view taken on line 2—2, of Figure 1.

Figure 3 is a diagrammatic side view of the heat exchanger.

Figure 4 is an end view of the same.

Figure 1:
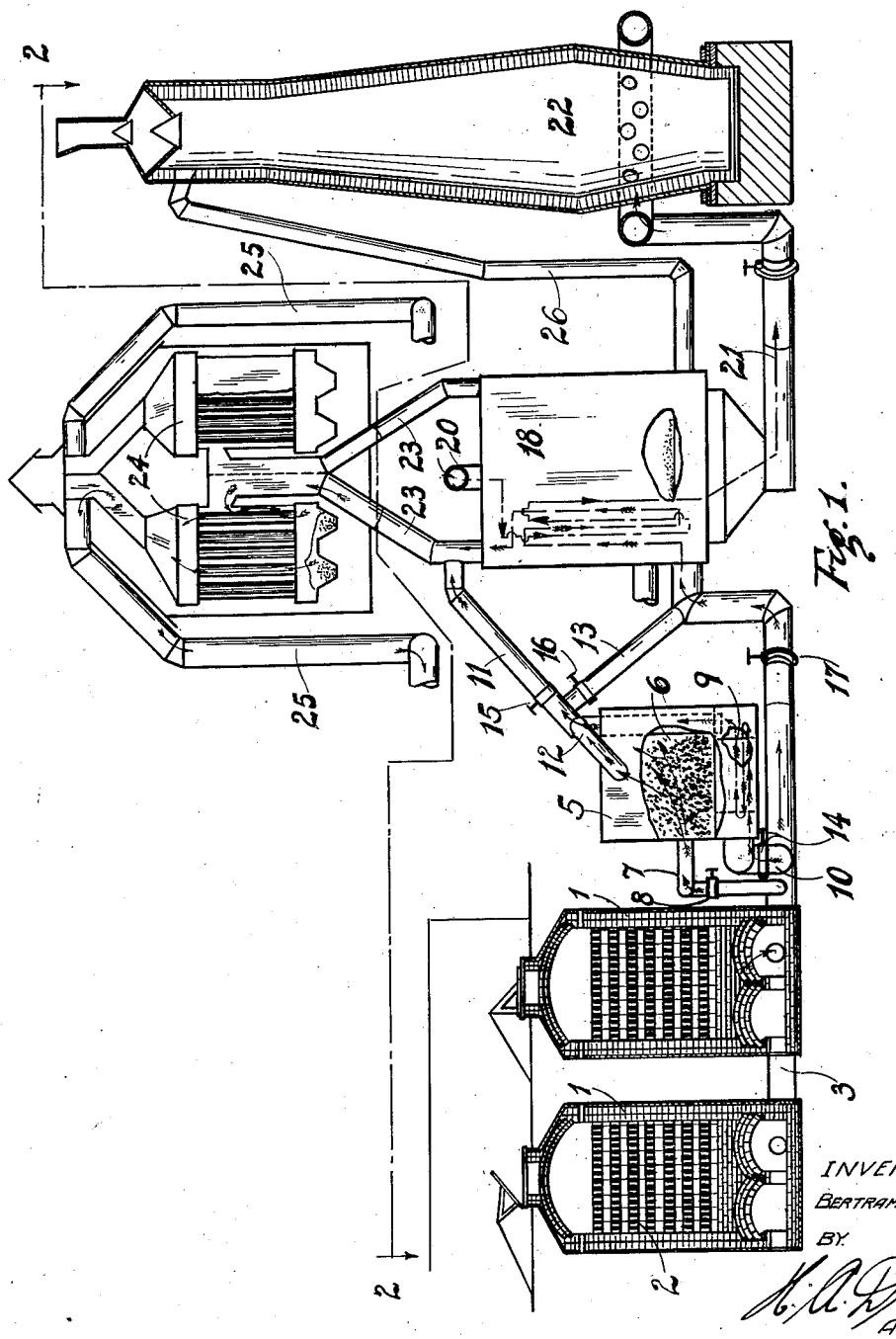
Figure 1 is a side elevation of my petroleum electric smelting process.

Referring more particularly to the drawings, the numeral 1—1 includes oil carbonizers which include checker brick 2 which are heated to a high temperature, the oil is then passed over the checker brick and is thus carbonized. The details of this method are well known and old in the art, and form no part of the present invention.

The oil gas process is pointed out in United States Patent Number 883,466, of March 31, 1908. The gas formed is at a high temperature, and it is desirable to recover the sensible heat thereof, and also the sensible heat of the carbon, as will be further described.

A manifold 3 extends adjacent the carbonizers 1 and at the lower end thereof, and each of the carbonizers are connected to the manifold 3 by a pipe 4. The gas carries with it considerable carbon and in order to recover this carbon and also take advantage of the sensible heat thereof, I provide an ore chamber 5 in which a quantity of ore is placed of the character to be subsequently charged into the blast furnace, as shown at 6. A pipe 7 extends from the manifold 3 into the ore mat 6 to conduct the gas and its burden of carbon into the ore mat.

A valve 8 is provided in the pipe 7 so that the same can be opened or closed at will. If it is found undesirable to pass the gas through an ore mat, a chamber 9 is provided below the ore mat, and a pipe 10 extends from the manifold 3 into this lower chamber. The gas in passing through the chamber 9 loses a portion of its sensible heat into the ore mat 6 by conduction through the intervening wall. An outlet pipe 11 extends from the ore mat chamber 5 and a pipe 12 extends from the lower chamber 9 into the pipe 11. A by-pass pipe 13 extends from the pipe 11 back into the main manifold 3.

A control valve 14 is provided in the pipe 10 and control valves 15—16 are provided in the pipes 11—13 respectively. A valve 17 is set in the manifold 3 and when this valve is closed, the gas is directed through the chambers 5 or 9 as previously described.

A heat exchanger 18 forms a unit of my process, and the manifold 3 extends into the exchanger adjacent the bottom thereof. Baffle walls 19 are formed in the heat exchanger so as to provide a tortuous passage for the incoming gas. An air intake pipe 20 extends into the heat exchanger and passes tortuously therethrough. The air in passing through the pipe 20 is heated by the gas in the heat exchanger, that is, there is a transferring of the sensible heat of the gas to the air in the pipe. The heated air passes into the outlet pipe 21 and thence into the blast furnace 22.

The cooler gas, after it passes through the heat exchanger 18, is emitted through the outlet pipes 23, and is passed into the electrical precipitator 24. The precipitator 24 is of usual and well known design, and the details thereof form no part of this invention. In the electrical precipitator, the carbon is dropped from the gas by electrical means. The pipe 11 extends into one of the outlet pipes 23 so that any gas which has previously passed through or around the ore mat 6 will also be directed into the electrical precipitator. The cooled and cleaned gas passes from the electrical precipitator, through pipes 25, and is stored or used as desired. A portion of the gas in the heat exchanger 18 may be obtained from the blast furnace through the conduit 26, said gas aiding in the preheating of the blast furnace air.

Having described my invention, I claim:

1. The petroleum smelting process which comprises first forming a petroleum gas with its sensible heat, said gas containing carbon with its sensible heat, then passing the gas and the carbon to a chamber containing an ore mat, which ore is subsequently to be used in the blast furnace, then passing the gas and the carbon into a heat exchanger, then passing blast furnace air through the heat exchanger whereby the sensible heat of the gas and the carbon is transferred to the air, and then conducting the gas to an electrical precipitator where the carbon is removed from the gas.

2. The petroleum smelting process which comprises forming an oil gas with its sensible heat and its burden of carbon, also with sensible heat, then passing the gas and carbon with their sensible heats to a chamber containing an ore mat, the initial temperature of the ore mat being less than the initial temperature of the gas and carbon, subsequently smelting the ore in the mat, which ore has received a part of the sensible heat of the gas and carbon, then conducting the cooled gas and carbon to a precipitator where the carbon is removed from the gas.

3. The petroleum smelting process which comprises forming an oil gas with its sensible heat and its burden of carbon also with sensible heat, then passing the gas and carbon with their sensible heats to a chamber containing an ore mat, subsequently smelting the ore in the mat, then conducting the gas and carbon to a heat exchanger, passing blast furnace air through the heat exchanger whereby the sensible heat of the gas and carbon is transferred to the air, then conducting the cooled gas and carbon to a precipitator where the carbon is removed from the gas.

4. The petroleum smelting process which comprises forming an oil gas with its sensible heat and its burden of carbon also with sensible heat, then passing the gas and carbon with their sensible heats in a continuous stream to a chamber containing an ore mat, said stream passing continuously through the chamber and subsequently smelting the ore in the mat.

5. A petroleum smelting process which comprises forming an oil gas with its sensible heat and its burden of carbon, also with sensible heat, forming an ore mat, then moving said mat and the gas with its carbon relative to each other in a continuous movement, and subsequently smelting the ore in the mat.

6. The petroleum smelting process which comprises adding natural gas to petroleum gas and the contained free carbon in the gas, said gases and carbon containing sensible heat, then passing the petroleum gas, natural gas and carbon with their sensible heats to a chamber containing an ore mat, which ore is subsequently to be used in the blast furnace, then passing the gases through a heat exchanger, then passing a fluid through the heat exchanger transferring the sensible heat of the gases and the sensible heat of the carbon to the fluid, then conducting the fluid to a place of useful work.

In testimony whereof, I affix my signature.

BERTRAM E. CROCKER.